April 13, 1954 L. H. WEBER 2,675,103
COMBINATION CLUTCH AND BRAKE MECHANISM
Filed Dec. 29, 1950 3 Sheets-Sheet 1

INVENTOR.
LLOYD H. WEBER
BY Charles H. Line
Ivan D. Thornburgh
ATTORNEYS

April 13, 1954 L. H. WEBER 2,675,103
COMBINATION CLUTCH AND BRAKE MECHANISM
Filed Dec. 29, 1950 3 Sheets-Sheet 2
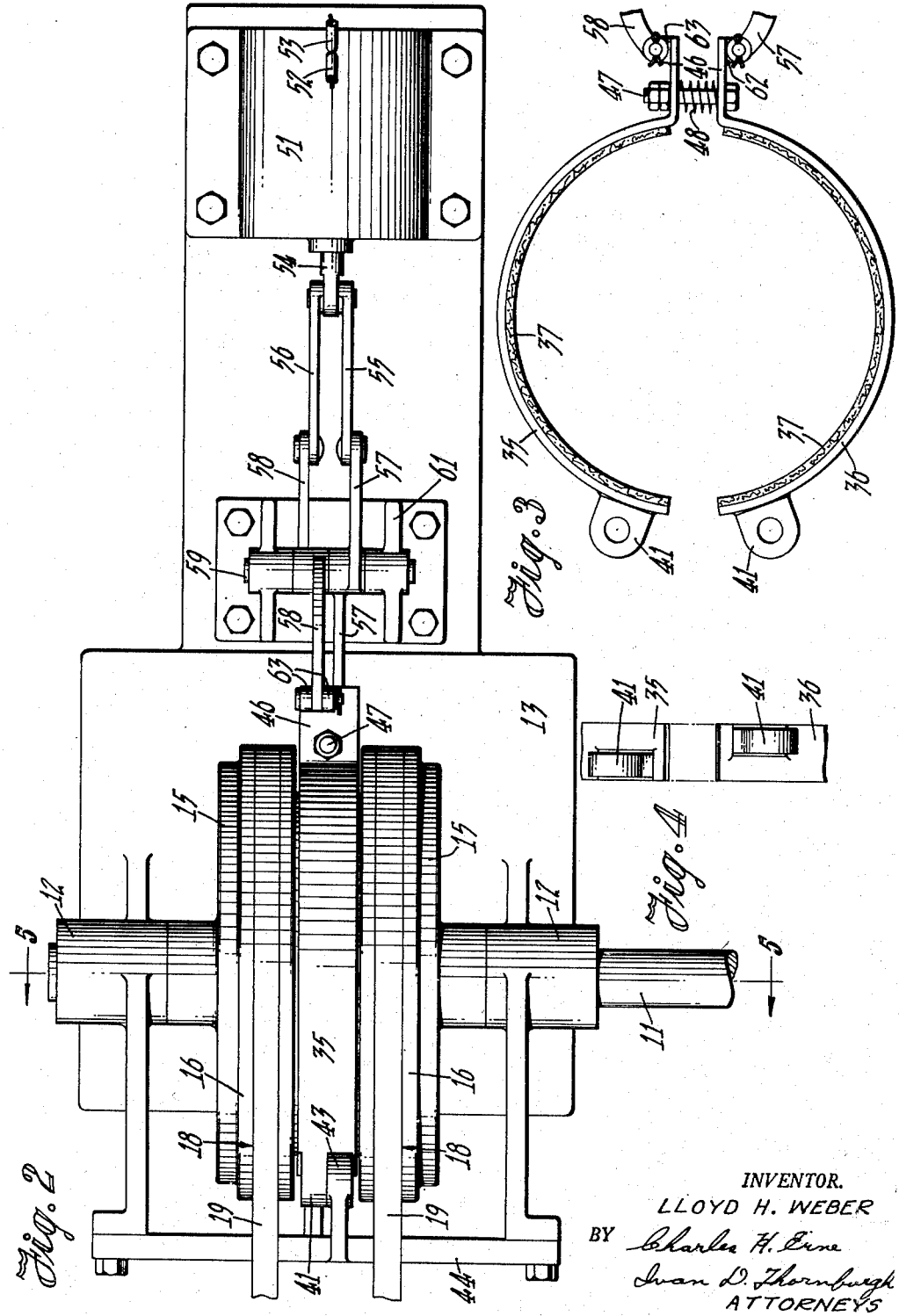
INVENTOR.
LLOYD H. WEBER
BY Charles H. Erne
Ivan D. Thornburgh
ATTORNEYS April 13, 1954    L. H. WEBER    2,675,103
COMBINATION CLUTCH AND BRAKE MECHANISM
Filed Dec. 29, 1950    3 Sheets-Sheet 3
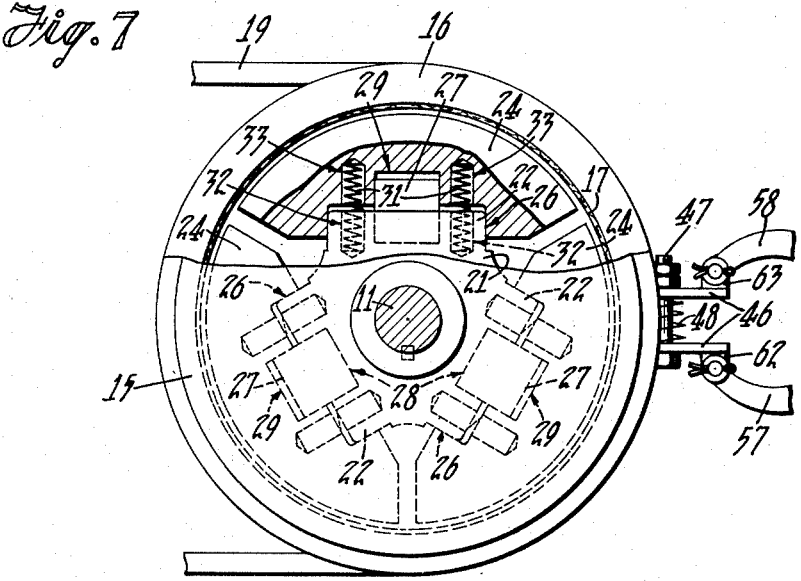
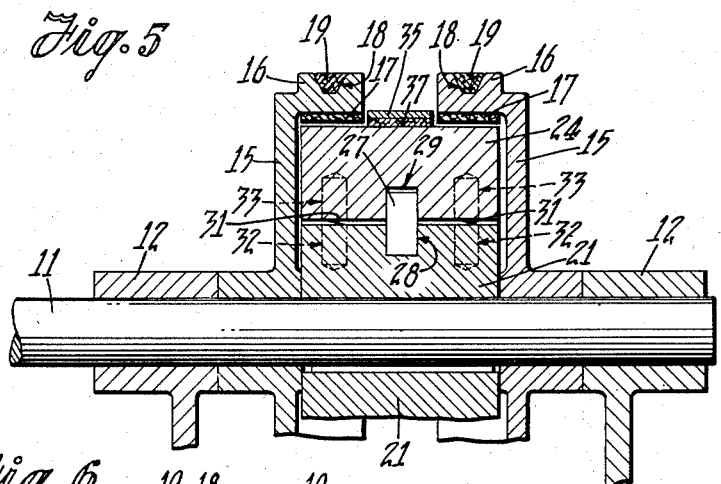
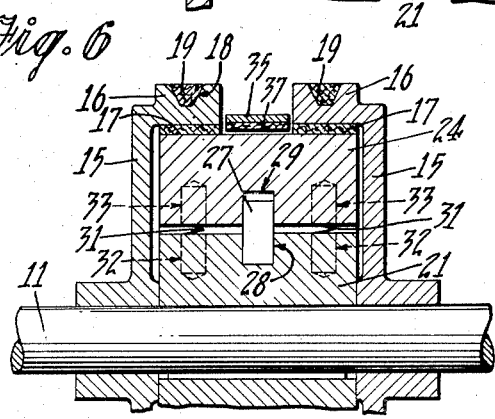
INVENTOR.
LLOYD H. WEBER
BY Charles H. Erne
Ivan D. Thornburgh
ATTORNEYS Patented Apr. 13, 1954

2,675,103

UNITED STATES PATENT OFFICE 2,675,103

COMBINATION CLUTCH AND BRAKE MECHANISM

Lloyd H. Weber, Newark, N. J., assignor to American Can Company, New York, N. Y., a corporation of New Jersey Application December 29, 1950, Serial No. 203,367

8 Claims. (Cl. 192—17)

The present invention relates to a clutch and brake mechanism for driving and stopping machines and has particular reference to a unitary mechanism which is controlled through the operation of the brake.

An object of the invention is the provision of a combination clutch and brake mechanism which is simple and compact in construction and economical in cost and which has few but sturdy parts which readily adapt the mechanism to heavy duty use.

Another object is the provision of such a clutch and brake mechanism wherein declutching and braking may be effected rapidly, solely through the operation of the brake.

Another object is the provision of such a mechanism wherein a simple driven yieldable member serves both the clutch elements and the brake elements for the dual purposes of driving or stopping the machine.

Numerous other objects and advantages of the invention will be apparent as it is better understood from the following description, which, taken in connection with the accompanying drawings, discloses a preferred embodiment thereof.

Referring to the drawings:

Fig. 2 is a top plan view of the mechanism shown in Fig. 1, with parts broken away;

Fig. 3 is a detail view of the brake bands used in the mechanism and shown in Figs. 1 and 2;

Fig. 4 is an end view of the brake bands shown in Fig. 3, as viewed from the left in Fig. 3, with parts broken away;

Fig. 5 is a fragmentary sectional view as taken substantially along the line 5—5 in Fig. 2;

Fig. 6 is a view similar to Fig. 5 with certain of the parts shown in different positions; and Fig. 7 is an end view of the parts shown in Fig. 5, with parts broken back and parts broken away.

Figure 1:
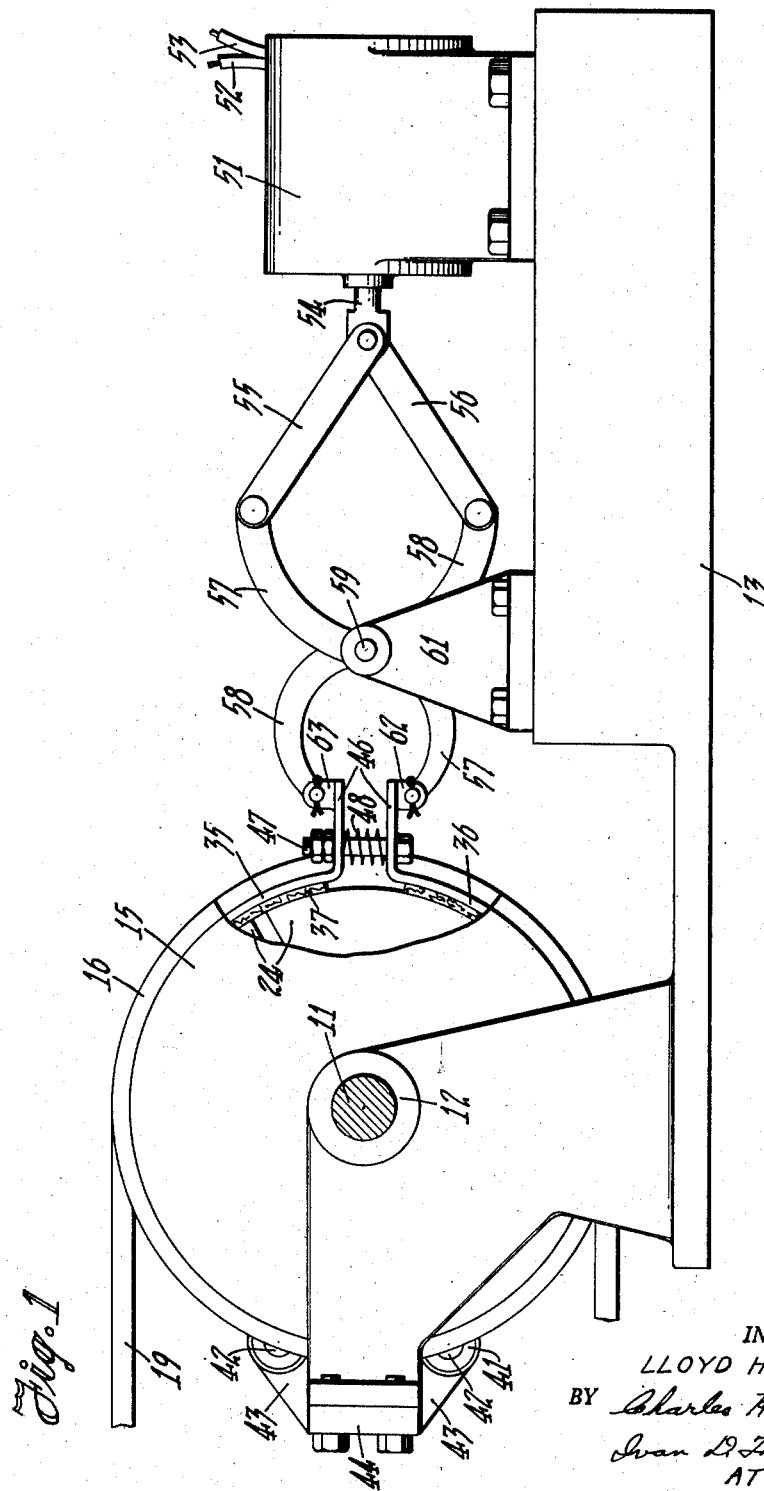
Figure 1 is an elevational view of a clutch and brake mechanism embodying the instant invention, with parts broken away.

As a preferred or exemplary embodiment of the invention the drawings disclose a combination clutch and brake mechanism for actuating and stopping a machine, for example a can or container making machine such as a bodymaker in which jams often occur and require immediate stopping of the machine to prevent its being damaged. Such a machine usually is provided with a main driving shaft indicated in the drawings by the numeral 11. This shaft 11 is journaled in suitable bearings which include a pair of spaced bearings 12 formed in a bracket 13 which may be a part of or attached to the main frame of the machine.

The combination clutch and brake mechanism is formed as a compact unit which surrounds the main driving shaft 11. For this purpose the mechanism is provided with a pair of spaced and parallel driving clutch drums or members 15 which surround the main driving shaft 11, between the shaft bearings 12 and preferably are mounted on the shaft itself (see Fig. 5). The clutch drums 15 are loose on the shaft so that they can freely rotate thereon.

At their outer peripheries the clutch drums 15 are formed with laterally and inwardly projecting rims 16. The inner circumferential surfaces of these rims 16 preferably are lined with composition friction clutch bands 17, the inner exposed surfaces of which constitute clutch driving surfaces. The outer periphery of the rims 16 are formed with driving grooves 18 for driving belts 19 which are driven in any suitable manner such as by an electric motor or other motive power. There are two driving belts 19, one for each clutch drum 15 and they are operated synchronously for rotating the clutch drums in unison, preferably at the same speed of rotation and preferably in a continuous manner.

Between and within the clutch drums 15, the main driving shaft 11 carries a hub 21 (Figs. 5, 6 and 7) which is keyed to the shaft and therefore rotates with the shaft as a unit. The hub 21 preferably is formed with three equiangularly spaced support blocks 22 (Fig. 7) each of which supports a segmental driven member or shoe 24, thus providing three equally spaced shoes surrounding the driving shaft. The outer faces of the shoes 24 are curved to fit the inner or driving faces of the rims 16 of the clutch drums 15. These shoes 24 are of sufficient width to span the distance between the clutch drums 15 and extend under both of the rims 16.

The segmental shoes 24 are mounted on the support blocks 22 for radial movement relative thereto. For this purpose the inner face of each of the shoes is formed with a wide transverse slideway 26 which fits over the outer end of its co-operating support block 22 for radial sliding movement thereon. The shoes are retained in place on the blocks against transverse and longitudinal movement by rectangular keys 27 which are secured in keyways 28 formed in the blocks and which operate radially in auxiliary keyways 29 formed in the shoes.

For actuating the main driving shaft 11 to operate the machine connected thereto, the shoes 24 are pressed outwardly against the linings 17 of the clutch drums 15. This is brought about by a plurality of compression springs 31 which are interposed between the shoes 24 and the hub 21. The drawings show four of these springs 31 for each shoe. Each spring is housed within a blind bore 32 formed in the hub and an aligning blind bore 33 formed in the shoe. The springs exert an outward force against the shoes 24 and thus press the shoes outwardly and hold the outer curved faces of the shoes in frictional contact with the driving faces of the clutch drums 15. Hence the rotating clutch drums, driven by the belts 19, drive the shoes 24, hub 21 and the main driving shaft 11 as a unit and thus actuate the machine connected with the shaft.

When it is desired to stop the machine, the shoes 24 are contracted against the resistance of the springs 31 and thus the shoes become disengaged from the clutch drums 15, and permit the drums to continue their rotation without driving the main driving shaft 11. This contraction of the shoes 24 is brought about preferably by a braking device which includes a pair of curved brake bands 35, 36 (Fig. 3) which surround and are disposed closely adjacent the outer curved faces of the shoes 24. These brake bands are located in the space between the inwardly projecting rims 16 of the clutch drums 15. Therefore the brake bands preferably operate against the same outer faces of the shoes that operate against the clutch rims. The inner faces of the brake bands preferably are provided with brake lining 37 to facilitate frictional engagement with the faces of the shoes.

One end of each of the brake bands 35, 36 is formed with an eye lug 41 (Figs. 3 and 4) which is secured by a pivot pin 42 (Fig. 1) to a stationary bracket 43 (see also Fig. 2) formed on a transverse bar 44 of the bracket 13. These lugs and pins anchor this one end of the brake bands to the frame. The opposite ends of the brake bands 35, 36 are formed with clamping tails 46 (Figs. 2 and 3) which are yieldably tied together by a bolt 47 which extends through holes in the tails. A compression spring 48 interposed between the tails 46 and wrapped around the bolt, spreads the tails apart and thus normally keeps the brake bands out of contact with and in spaced relation to the curved outer faces of the shoes 24.

When the clamping tails 46 are moved toward each other against the resistance of the spring 48, the brake bands 35, 36 are drawn tight, into engagement with the outer faces of the shoes 24. It should be noted here that this action effects a dual function or operation which is an important feature of this invention. This feature is the disengagement of the clutch drums 15 and the immediate application of the brake. By drawing the brake bands 35, 36 tight, the bands contract the shoes 24 against the springs 31 and simultaneously apply a braking action against them. Thus this action of contracting the shoes, withdraws the shoes from the clutch rims 16 and thus releases the shoes from the clutch drums, permitting the drums to continue their rotation, while the same action applies the brake to the shoes and through the connecting hub 21, immediately stops the main driving shaft 11 and the machine connected therewith.

With such a combination clutch and brake mechanism, the release of the clutch drums and the application of the brake is effected almost simultaneously. Thus the machine can be stopped instantly without interruption between the two operations. In reverse order, the machine may also be started instantly when the brake is released and the shoes are again engaged with the clutch drums. The release of the brake is effected by the spring 48 and through this release the springs 31 force the shoes outwardly against the clutch drum rims and thus control the starting of the machine. Usually the springs 31 will allow some slippage between the shoes and the clutch drums during the initial starting operation and thus permit of a gradual starting of the machine.

Actuation of the brake bands 35, 36 through their clamping tails 46 may be effected in any suitable manner. As an example of such a manner, Figs. 1 and 2 of the drawings show the tails 46 actuated through link connection with an electric solenoid 51 connected by wires 52, 53 to any suitable means, such as an electric switch, for energizing and de-energizing the solenoid. The solenoid 51 is provided with a movable core 54, the outer end of which is pivotally connected to a pair of toggle links 55, 56. The opposite ends of the toggle links are separately connected to respective S-shaped levers 57, 58 which intermediate their ends are mounted side-by-side on a single pivot shaft 59 carried in a bearing bracket 61 secured to the main frame 13. The levers are also connected as shown in Figs. 1 and 2, to respective lugs 62, 63 formed on the clamping tails 46 of the brake bands 35, 36.

Hence, when the solenoid 51 is energized, which energization may be brought about by a jam in the machine causing a switch to close as is the usual practice, the energized solenoid draws its core 54 inwardly and thus pulls on the toggle links 55, 56. This action on the toggle links pivots the S-shaped levers 57, 58 in scissor fashion and thus moves the clamping tails 46 toward each other, with the result that the brake bands 35, 36 are drawn tight to effect a braking action on the driven shoes 24. In reverse order, the brake bands are released when the solenoid 51 is de-energized. In this case, the compression spring 48 between the clamping tails 46 of the brake bands, spreads the tails apart to release the brake and reclutch the shoes 24 and this spreading action pivots the S-shaped levers 57, 58 on shaft 59 and through the toggle links 55, 56, withdraws the core 54 from the solenoid 51 into the normal or de-energized position of the core. Thus the core is in position for a reapplication of the brake.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a clutch and brake mechanism for driving and stopping a machine, the combination of a machine driving shaft, a rotatable driving clutch member surrounding said shaft and mounted loosely relative thereto, said clutch member having a laterally projecting rim, a hub secured to said driving shaft adjacent said clutch member, a driven shoe member loosely mounted on said hub and interposed between said hub and said clutch member rim, pressure means disposed between said hub and said shoe member for pressing said shoe member outwardly against said rim for providing a driving connection between said clutch member and said shaft to drive the machine, and brake means engageable against said shoe member for disengaging said shoe member from said clutch member rim to break the driving connection and to brake said driven shoe member and said shaft to stop the machine.

2. In a clutch and brake mechanism for driving and stopping a machine, the combination of a machine driving shaft, a rotatable driving clutch member surrounding said shaft and mounted loosely relative thereto, said clutch member having a laterally projecting rim, a hub secured to said driving shaft adjacent said clutch member, a plurality of segmental shoe members loosely mounted on said hub and interposed between said hub and said clutch member rim, a key block interposed between each of said shoe members and said hub for retaining said shoe members in position on said hub, pressure means disposed between said hub and said shoe members for pressing said shoe members outwardly against said rim for providing a driving connection between said clutch member and said shaft to drive the machine, and brake means engageable against said shoe members for disengaging said shoe members from said clutch member rim to break the driving connection and to brake said driven shoe members and said shaft to stop the machine.

3. In a clutch and brake mechanism for driving and stopping a machine, the combination of a machine driving shaft, a rotatable clutch drum surrounding said shaft and mounted loosely relative thereto, a segmental shoe disposed within said clutch drum and having a driving connection with said shaft, said shoe having an outer driving face engageable with the inner peripheral surface of said drum and extending laterally beyond said drum for driving said shaft to drive said machine, pressure means operable against said shoe for maintaining its driving face in engagement with said drum, and brake means disposed adjacent said drum and engageable against the laterally extended portion of the outer driving face of said shoe for disengaging said shoe from said clutch drum to break the driving connection and to brake said shoe and said shaft to stop the machine.

4. In a clutch and brake mechanism for driving and stopping a machine, the combination of a machine driving shaft, a pair of spaced rotatable clutch drums surrounding said shaft and mounted loosely relative thereto, a segmental shoe disposed between and within said clutch drums and having a driving connection with said shaft, said shoe having an outer driving face engageable with the inner peripheral surface of both of said drums for driving said shaft to drive said machine, pressure means operable against said shoe for maintaining its driving face in engagement with said drums, and brake means disposed between said drums and engageable against the outer driving face of said shoe for disengaging said shoe from said clutch drums to break the driving connection and to brake said shoe and shaft to stop the machine.

5. In a clutch and brake mechanism for driving and stopping a machine, the combination of a machine driving shaft, a rotatable driving clutch member mounted loosely on said shaft, said clutch member having a laterally projecting rim, means for rotating said clutch member, a hub mounted on and secured to said driving shaft adjacent said clutch member, a radially disposed slide block on said hub, a segmental shoe member having a radial slideway mounted for radial sliding movement on said slide block, said shoe member being interposed between said hub and said clutch rim and having a curved outer face for engagement with said rim, means for retaining said shoe member in radial position on said slide block, spring means disposed between said hub and said slide block for pressing said shoe member outwardly against said rim for providing a driving connection between said clutch member and said shaft to drive the machine, and brake means engageable against the curved outer face of said shoe member for disengaging said shoe member from said clutch member rim to break the driving connection and to brake said shoe member and said shaft to stop the machine.

6. In a clutch and brake mechanism for driving and stopping a machine, the combination of a machine driving shaft, a rotatable driving clutch member surrounding said shaft and mounted loosely relative thereto, said clutch member having a laterally projecting rim, a hub secured to said driving shaft adjacent said clutch member, a plurality of segmental shoe members mounted on said hub for radial movement relative thereto and interposed between said hub and said clutch member rim, said shoe members having outer curved faces for engagement with said clutch rim, pressure means disposed between said hub and said shoe members for pressing said shoe members outwardly against said rim for providing a driving connection between said clutch member and said shaft to drive the machine, a pair of curved brake bands surrounding said shoe members adjacent their outer curved faces, means for anchoring one end of each of said brake bands, clamping tails formed on the opposite ends of said brake bands and disposed in spaced relation, pressure means between said tails for spreading said bands apart to clear the outer faces of said shoe members, and means for moving said tails toward each other for tightening said brake bands against the curved faces of said shoe members for disengaging said shoe members from said clutch rim to break the driving connection and to brake said shoe members and said shaft to stop the machine.

7. A combined clutch and brake mechanism for driving and stopping a machine, comprising a machine driving shaft, a rotating driving member loosely mounted on and surrounding said shaft, a rotatable driven member secured to said shaft and disposed between the latter and said driving member, yieldable pressure means extending radially of said shaft for normally engaging said driven member with said driving member to drive said shaft and said machine, and a normally disengaged brake member having means for moving the same in a plane transversely of said shaft to engage the brake member with said driven member for disengaging the latter from said driving member against the force exerted by said pressure means and for applying braking action by said brake member to said driven member and said shaft to stop the machine.

8. A combined clutch and brake mechanism for driving and stopping a machine, comprising a machine driving shaft, a rotatable driving clutch member loosely mounted on and surrounding said shaft and having means for continuously driving the same, said clutch member having a laterally projecting circumferential driving surface, a driven member secured to said shaft and disposed between the latter and said clutch member driving surface, spring pressure means extending radially of said shaft for yieldably forcing said driven member into driving engagement with said clutch member driving surface to drive said shaft and said machine, and a normally disengaged brake member having means for moving the same in a plane transversely of said shaft to engage the brake member with said driven member to force the same radially inwardly against the tension of said pressure means for disengaging the driven member from said clutch member driving surface while coincidentally applying braking action to said driven member on said shaft, thereby stopping the machine.

References Cited in the file of this patent

UNITED STATES PATENTS

| Number | Name | Date |
|---|---|---|
| 2,175,382 | Eason | Oct. 10, 1939 |